United States Patent
Berge

(10) Patent No.: US 9,701,854 B2
(45) Date of Patent: *Jul. 11, 2017

(54) AQUEOUS INK-JET INKS CONTAINING RANDOM POLYURETHANES AS BINDERS

(71) Applicant: E I DU PONT DE NEMOURS AND COMPANY, Wilmington, DE (US)

(72) Inventor: Charles T. Berge, Earleville, MD (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 150 days.

This patent is subject to a terminal disclaimer.

(21) Appl. No.: 14/395,830

(22) PCT Filed: Apr. 30, 2013

(86) PCT No.: PCT/US2013/038753
§ 371 (c)(1),
(2) Date: Oct. 21, 2014

(87) PCT Pub. No.: WO2013/165946
PCT Pub. Date: Nov. 7, 2013

(65) Prior Publication Data
US 2015/0080527 A1  Mar. 19, 2015

Related U.S. Application Data

(60) Provisional application No. 61/640,052, filed on Apr. 30, 2012.

(51) Int. Cl.
| | | |
|---|---|---|
| *C08G 18/08* | (2006.01) | |
| *C08G 18/48* | (2006.01) | |
| *C08G 18/66* | (2006.01) | |
| *C08G 18/75* | (2006.01) | |
| *C08G 18/76* | (2006.01) | |
| *C08L 75/04* | (2006.01) | |
| *C09D 11/102* | (2014.01) | |
| *C09D 11/30* | (2014.01) | |
| *C09D 11/322* | (2014.01) | |

(52) U.S. Cl.
CPC ........ *C09D 11/102* (2013.01); *C08G 18/0823* (2013.01); *C08G 18/4854* (2013.01); *C08G 18/6692* (2013.01); *C08G 18/755* (2013.01); *C08G 18/765* (2013.01); *C08L 75/04* (2013.01); *C09D 11/30* (2013.01); *C09D 11/322* (2013.01)

(58) Field of Classification Search
CPC ..... C09D 11/102; C09D 11/30; C09D 11/322; C08G 18/4854; C08G 18/6692; C08G 18/755; C08G 18/765; C08G 18/0823; C08L 75/04
See application file for complete search history.

(56) References Cited

U.S. PATENT DOCUMENTS

| | | |
|---|---|---|
| 3,479,310 A | 11/1969 | Dietrich et al. |
| 4,108,814 A | 8/1978 | Reiff et al. |
| 4,408,008 A | 10/1983 | Markusch |
| 4,871,798 A | 10/1989 | Dormish et al. |
| 5,085,698 A | 2/1992 | Ma et al. |
| 5,128,434 A | 7/1992 | Lai |
| 5,990,245 A | 11/1999 | Esselborn et al. |
| 5,990,839 A | 11/1999 | Schefte et al. |
| 6,248,839 B1 | 6/2001 | Esselborn et al. |
| 2008/0241485 A1 | 10/2008 | Shimohara et al. |
| 2010/0093119 A1 | 4/2010 | Shimizu |
| 2011/0018928 A1 | 1/2011 | Li et al. |
| 2013/0267656 A1* | 10/2013 | Berge .................. C09D 11/322 524/591 |

FOREIGN PATENT DOCUMENTS

| | | |
|---|---|---|
| WO | 2009076381 | 6/2009 |
| WO | 2012030890 | 3/2012 |

* cited by examiner

*Primary Examiner* — Patrick Niland
(74) *Attorney, Agent, or Firm* — Simon L. Xu

(57) ABSTRACT

The present disclosure provides novel aqueous ink-jet inks containing an aqueous vehicle, a pigment and a random polyurethane copolymer as a binder. The random polyurethane copolymer contains short hard segments without any ionic group. Also disclosed is the use of these dispersions in an ink-jet ink.

18 Claims, No Drawings

AQUEOUS INK-JET INKS CONTAINING RANDOM POLYURETHANES AS BINDERS

CROSS REFERENCE TO RELATED APPLICATIONS

This application claims priority under 35 U.S.C. §119 from U.S. Provisional Application Ser. No. 61/640,052, filed Apr. 30, 2012, which is incorporated by reference in its entirety.

BACKGROUND OF THE INVENTION

This disclosure relates to novel aqueous ink-jet inks containing an aqueous vehicle, a pigment and a random polyurethane copolymer as a binder.

Polyurethanes are typically products of the reaction of a polyisocyanate and a polyol. Hard segments are typically made by inclusion of a short chain diol or diamine which when reacted with isocyanates produces urea or carbamate groups within a short distance from each other. The close proximity of urea or carbamate groups is important when intermolecular H-bonding is desired. The intermolecular H-bonding results in the formation of semi-crystalline regions within the polymer matrix. The semi-crystalline regions can be viewed as intermolecular crosslinks that give polyurethanes and polyureas their toughness and elasticity. U.S. Pat. No. 5,128,434 discloses the control of hard segment size in polyurethane formation by reacting two mole equivalents of a diisocyanate with about one mole equivalent of a low molecular weight diol.

A need exists for highly stable and higher-quality inks for ink-jet applications. Although improvements in polyurethane dispersants and binders have significantly contributed to improved ink-jet inks, the current dispersants and binders still do not provide inks with the requisite stability, print nozzle health and lifetime needed for ink-jet applications. The properties of the printed ink such as durability, fastness and optical density (OD) still require improvements. The present invention satisfies this need by providing ink compositions based on a random polyurethane copolymer composition having short hard segments without any ionic group.

SUMMARY OF THE INVENTION

The inventor found that polyurethane copolymers having a short hard segment without any ionic group in one monomer, a hydrophilic segment in a second monomer, and a hydrophobic segment in a third monomer can impart significant improvement in the durability, printability, jetting performance, etc. of the ink when used in an inkjet ink.

An embodiment of the invention provides an aqueous ink-jet ink comprising an aqueous vehicle, a pigment and a random copolymer as a binder, wherein said random copolymer is derived from the polymerization of a diisocyanate with three or more diols including a first diol and a second diol, wherein said first diol contains one or more hydrophilic stabilizing groups, the number of backbone atoms on the chain between the two hydroxyl groups of said second diol is less than 8, and the mole % of said second diol and total diols is at least 30%, said copolymer has a general structure of Formula I:

$$OCN\text{---}[Q^1]_n\text{---}[Q^2]_m\text{---}[Q^3]_p R^1\text{---}NCO \quad (I)$$

wherein the terminal isocyanate groups in said copolymer are capped with a capping agent; each $Q^1$, $Q^2$ and $Q^3$ is independently

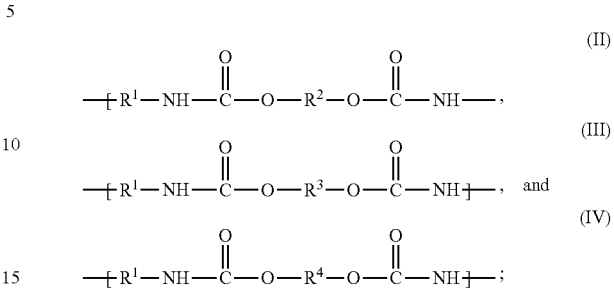

provided that $Q^1$, $Q^2$ and $Q^3$ contain at least one Formula II, one Formula III and one Formula IV groups;

each $R^1$ is $C_1$-$C_{20}$ alkyl, $C_3$-$C_{20}$ substituted alkyl, $C_3$-$C_{10}$ cycloalkyl, $C_3$-$C_{20}$ substituted cycloalkyl, $C_6$-$C_{40}$ aryl or $C_9$-$C_{40}$ substituted aryl from a diisocyanate;

each $R^2$ is independently $C_3$-$C_{20}$ substituted alkyl, $C_3$-$C_{20}$ substituted cycloalkyl or $C_9$-$C_{40}$ substituted aryl;

each $R^3$ is independently $C_9$-$C_{20}$ alkyl, $C_9$-$C_{20}$ alkyl substituted by $C_1$-$C_{10}$ alkyl or $C_6$-$C_{15}$ aryl; $C_9$-$C_{40}$ aryl or $C_9$-$C_{40}$ aryl substituted by $C_1$-$C_{10}$ alkyl or $C_6$-$C_{20}$ aryl, $-(R^{11}\text{---}O\text{---}R^{10}\text{---}O\text{---}R^{11})-$; or HO$-R^3-$OH is a diol incorporating polyether, polyester, polycarbonate, polycarbonate-co-polyester or acrylic;

each $R^4$ is independently $C_1$-$C_7$ alkyl, $C_3$-$C_{20}$ alkyl substituted by $C_1$-$C_{10}$ alkyl of $C_6$-$C_{15}$ aryl; $C_6$-$C_{40}$ aryl or $C_9$-$C_{40}$ aryl substituted by $C_1$-$C_{10}$ alkyl or $C_6$-$C_{20}$ aryl, provided that the backbone atoms on $R^4$ forming a chain linking the two oxygen atoms in Formula IV are less than 8;

n, m and p are integers from 1 to 200;

said capping agent is one or more members selected from the group consisting of $R^5CHR^6OH$, $R^5CHR^6SH$, $R^6R^7NH$, $H\text{---}(OR)_q$, $-OH$, and epoxide $CH_2OCR^6R^7$;

each $R^5$ is H, $C_1$-$C_{20}$ alkyl, $C_3$-$C_{20}$ alkyl substituted by $C_1$-$C_{10}$ alkyl of $C_6$-$C_{15}$ aryl; $C_6$-$C_{40}$ aryl or $C_9$-$C_{40}$ aryl substituted by $C_1$-$C_{10}$ alkyl or $C_6$-$C_{20}$ aryl;

each $R^6$ is H, $C_1$-$C_{20}$ alkyl, $C_6$-$C_{40}$ aryl or $-R^9OR^8$;

each $R^7$ is H, $-R^9OR^8$, $C_1$-$C_{20}$ alkyl, $C_3$-$C_{20}$ alkyl substituted by $C_1$-$C_{10}$ alkyl of $C_6$-$C_{15}$ aryl; $C_6$-$C_{40}$ aryl or $C_9$-$C_{40}$ aryl substituted by $C_1$-$C_{10}$ alkyl or $C_6$-$C_{20}$ aryl, provided that when $R^6$ is H, $R^7$ is not H;

$R^6$ and $R^7$ can be taken together with the nitrogen atom to form a cyclic amine or substituted cyclic amine with an O or S atom replacing a C atom on said cyclic amine;

each $R^8$ is $C_1$-$C_{20}$ alkyl or $C_6$-$C_{20}$ aryl;

each $R^9$ is $C_1$-$C_{20}$ alkyl or $C_3$-$C_{20}$ alkyl substituted by $C_1$-$C_{10}$ alkyl of $C_6$-$C_{15}$ aryl;

each $R^{10}$ is independently $C_4$-$C_{20}$ alkyl, $C_4$-$C_{20}$ alkyl substituted by $C_1$-$C_{10}$ alkyl or $C_6$-$C_{15}$ aryl; $C_9$-$C_{40}$ aryl or $C_9$-$C_{40}$ aryl substituted by $C_1$-$C_{10}$ alkyl or $C_6$-$C_{20}$ aryl;

each $R^{11}$ is independently $C_1$-$C_{10}$ alkyl, $C_4$-$C_{20}$ alkyl substituted by $C_1$-$C_{10}$ alkyl or $C_6$-$C_{15}$ aryl; and q is an integer from 1 to 20.

Another embodiment provides that $R^1$ is $C_3$-$C_{20}$ substituted cycloalkyl.

Another embodiment provides that $R^2$ is $C_3$-$C_{20}$ substituted alkyl.

Another embodiment provides that $R^3$ is $-(R^{11}\text{---}O\text{---}R^{10}\text{---}O\text{---}R^{11})-$.

Another embodiment provides that $R^4$ is $C_1$-$C_7$ alkyl.

Another embodiment provides that the capping agent is $R^6R^7NH$.

Another embodiment provides that $R^6$ and $R^7$ are —$R^9OR^8$.

Another embodiment provides that each $R^8$ and $R^9$ is $C_1$-$C_7$ alkyl.

Another embodiment provides that $R^6$ and $R^7$ are taken together with the nitrogen atom to form a cyclic amine.

Yet another embodiment provides that $R^6$ and $R^7$ are taken together with the nitrogen atom to form a substituted cyclic amine with an O or S atom replacing a C atom on said cyclic amine.

These and other features and advantages of the present invention will be more readily understood by those of ordinary skill in the art from a reading of the following Detailed Description. Certain features of the invention which are, for clarity, described above and below as a separate embodiment, may also be provided in combination in a single embodiment. Conversely, various features of the invention that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the dispersions produced with the polyurethane described above can be utilized to disperse particles, especially pigments for ink-jet inks. These inks can be printed on all normally used ink-jet substrates including textile substrates.

As used herein, the term "dispersion" means a two phase system where one phase consists of finely divided particles (often in the colloidal size range) distributed throughout a bulk substance, of the particles being the dispersed or internal phase and the bulk substance being the continuous or external phase.

As used herein, the term "dispersant" means a surface active agent added to a suspending medium to promote uniform and maximum separation of extremely fine solid particles often of colloidal size. For pigments, dispersants are most often polymeric dispersants. The polyurethane dispersants described herein are in fact dispersions themselves.

As used herein, the term "OD" means optical density.

As used herein, the term "aqueous vehicle" refers to water or a mixture of water and at least one water-soluble, or partially water-soluble (i.e. methyl ethyl ketone), organic solvent (co-solvent).

As used herein, the tem "ionizable groups," means potentially ionic groups.

As used herein, the term "substantially" means being of considerable degree, almost all.

As used herein, the term "MW" means weight average molecular weight.

As used herein, the term "Mn" means number average molecular weight.

As used herein, the term "D50" means the volume particle diameter of the 50th percentile (median) of the distribution of particle sizes.

As used herein, the term 'D95' means the volume particle diameter of the 95th percentile of the distribution of particle sizes.

As used herein, the term "NCO" means isocyanate.

As used herein, the term "cPs" means centipoise, a viscosity unit.

As used herein, the term "mN·m$^{-1}$" means milliNewtons per meter, a surface tension unit.

As used herein, the term "mPa·s" means millipascal second, a viscosity unit.

As used herein, the term "prepolymer" means the polymer that is an intermediate in a polymerization process, and can be considered a polymer.

As used herein, the term "AN" means acid number, mg KOH/gram of solid polymer.

As used herein, the term "OH number" means hydroxyl number, mg KOH/gram of solid polymer.

As used herein, the term "PUD" means the polyurethanes dispersions described herein.

As used herein, the term "BMEA" means bis(methoxyethyl)amine.

As used herein, the term "DBTDL" means dibutyltin dilaurate.

As used herein, the term "DEA" means diethanolamine.

As used herein, the term "DMPA" means dimethylol propionic acid.

As used herein, the term "HDI" means 1,6-hexamethylene diisocyanate.

As used herein, the term "IPDI" means isophorone diisocyanate.

As used herein, the term "TMDI" means trimethylhexamethylene diisocyanate.

As used herein, the term "TMXDI" means m-tetramethylene xylylene diisocyanate.

As used herein, the term "NMP" means n-Methyl pyrolidone.

As used herein, the term "2,4-TDI" means 2,4-toluene diisocyanate.

As used herein, the term "MDI" means 4,4'-diphenylmethane diisocyanate.

As used herein, the term "H$_{12}$MDI" means 4,4'-dicyclohexylmethane diisocyanate.

As used herein, the term "TODI" means 3,3'-dimethyl-4,4'-biphenyl diisocyanate.

As used herein, the term "C$_{12}$DI" means dodecane diisocyanate.

As used herein, the term "NDI" means 1,5-naphthalene diisocyanate.

As used herein, the term "HQEE" means hydroquinone bis(2-hydroxyethyl)ether.

As used herein, the term "TEB" means triethylene glycol monobutyl ether, a reagent supplied by Dow Chemical.

As used herein, the term "Sulfolane" means tetramethylene sulfone.

As used herein, the term "TRB-2" means Dainichiseika® TRB-2, a cyan pigment.

As used herein, Terathane® 650 is a polyether diol from Invista, Wichita, Kans.

As used herein, the term "TEDA" means Tetraethylene glycol diol.

As used herein, the term "Tetraglyme" means tetraethylene glycol dimethyl ether.

As used herein, the term "substituted alkyl" denotes substitution of hydrogen atom(s) on an alkyl moiety by functional group(s) including ethers, esters, amines, thioether, mercaptans, hydroxy, halides, and acid groups, etc.

As used herein, the term "substituted aryl" denotes substitution of hydrogen atom(s) on an aryl moiety by functional group(s) including ethers, esters, amines, thioether, mercaptans, hydroxy, halides, and acid groups, etc.

As used herein, the term "aralkyl" denotes aryl substitution on an alkyl moiety.

Examples of "aralkyl" include benzyl, diphenylmethyl, p-methylbenzyl and other aryl moieties bonded to straight-chain or branched alkyl groups.

Unless otherwise noted, the above chemicals were obtained from Aldrich (Milwaukee, Wis.) or other similar suppliers of laboratory chemicals.

In addition, references in the singular may also include the plural (for example, "a" and "an" may refer to one, or one or more) unless the context specifically states otherwise.

Polyurethane Copolymer Dispersants

Durable properties of polyurethanes have been associated with the balance of 'hard' and 'soft' segments. For polyurethanes formed by the reaction of a diisocyanate with a diol, the hard segment is defined as the segment in between and including two adjacent carbamate groups. A hard segment therefore has a carbamate group at each end. A soft segment in a polyurethane is formed from high molecular weight diols or polyols. A soft segment is mobile and normally present in a coiled formation. The urethane groups on one polymer chain form hydrogen bonding with the same or similar groups on neighboring polymer chains, resulting in a polyurethane network. Typically, a soft continuous phase surrounds a hard semi-crystalline region in a polyurethane network.

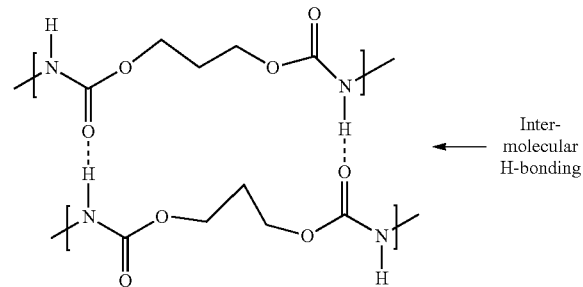

A hard segment is covalently coupled to a soft segment in a polyurethane. The balance of hard and soft segments provides a polyurethane with the desired level of elasticity and toughness necessary for individual end use. Typically, ionizable groups are incorporated into the hard segment to make the resulting polyurethane water dispersible. However, these ionizable groups can interfere with the inter-molecular hydrogen bonding between the urethane groups on neighboring polymer chains. Consequently, to strengthen the hydrogen bonding between the urethane groups on different polymer chains, one needs to separate the ionizable groups from the hard segment. This can then lead to tougher and more elastic polyurethane films. Separation of ionizable groups from hard segment can also lead to better control of the acid content while reducing the time for semi-crystalline region formation which translates into fast dry time.

The polyurethane copolymer dispersants of the present disclosure are prepared by the reaction of a diisocyanate with three different diols to form a general structure of Formula I:

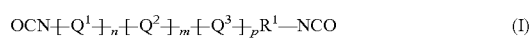

where the terminal isocyanate groups are capped with a capping agent. Each $Q^1$, $Q^2$ and $Q^3$ is independently

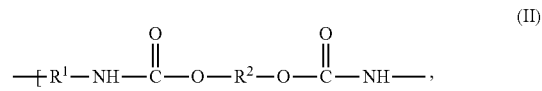

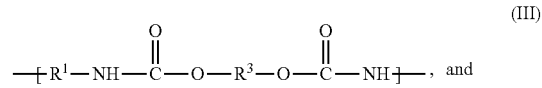

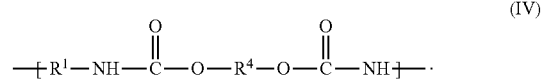

Each $R^2$ of $Q^1$ in Formula (II) comes from a diol HO—$R^2$—OH and is independently $C_3$-$C_{20}$ substituted alkyl, $C_3$-$C_{20}$ substituted cycloalkyl or $C_9$-$C_{40}$ substituted aryl. Diol HO—$R^2$—OH is either available from commercial sources or can be readily prepared by methods familiar to one of ordinary skill in the art. The substitutions on $R^2$ may contain an aqueous dispersing moiety that is ionic or ionizable. Examples of ionic dispersing groups include carboxylate groups (—COOM), phosphate groups (—OPO$_3$M$_2$), phosphonate groups (—PO$_3$M$_2$), sulfonate groups (—SO$_3$M), and quaternary ammonium groups (—NR$_3$Q), wherein M is a cation such as a monovalent metal ion (e.g., Na$^+$, K$^+$, Li$^+$, etc.), H$^-$ or NR$_4^+$; Q is a monovalent anion such as chloride or hydroxide; and each R can independently be an alkyl, aralkyl, aryl or hydrogen.

The ionizable groups in general correspond to the ionic groups, except that they are in the acid (such as carboxyl-COOH) or base (such as primary, secondary or tertiary amine-NH$_2$, —NRH, or —NR$_2$) form. The ionizable groups are such that they are readily converted to their ionic form during the dispersion/polymer preparation process as discussed below.

With respect to compounds which contain isocyanate reactive groups and ionic or potentially ionic groups, the isocyanate reactive groups are typically amino and hydroxyl groups. The potentially ionic groups or their corresponding ionic groups may be cationic or anionic, although the anionic groups are preferred. Specific examples of anionic groups include carboxylate and sulfonate groups. Examples of cationic groups include quaternary ammonium groups and sulfonium groups.

In the case of anionic group substitution, the groups can be carboxylic acid groups, carboxylate groups, sulphonic acid groups, sulphonate groups, phosphoric acid groups and phosphonate groups, The acid salts are formed by neutralizing the corresponding acid groups either prior to, during or after formation of the NCO prepolymer.

Suitable compounds for incorporating carboxyl groups are described in U.S. Pat. Nos. 3,479,310, 4,108,814 and 4,408,008. Examples of carboxylic group-containing compounds are the hydroxy-carboxylic acids corresponding to the formula $(HO)_pQ(COOH)_q$, wherein Q is $C_1$-$C_{10}$ alkyl, p is 1 or 2, and q is 1 to 3. Examples of these hydroxy-carboxylic acids include citric acid, tartaric acid and hydroxypivalic acid. Optional dihydroxy alkanoic acids include the α,α-dimethylol alkanoic acids represented by the structure of Formula V below:

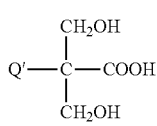

(V)

wherein Q' is hydrogen or $C_1$-$C_8$ alkyl. Additional α,α-dimethylol alkanoic acids are represented by the structural formula $R^5C$—$(CH_2OH)_2$—COOH, wherein $R^5$ is hydrogen or $C_1$-$C_8$ alkyl. Examples of these ionizable diols include, but are not limited to, dimethylolacetic acid, 2,2'-dimethylolbutanoic acid, 2,2'-dimethylolpropionic acid (DMPA), and 2,2'-dimethylolbutyric acid. Suitable carboxylates also include $H_2N$—$(CH_2)_4$—$CH(CO_2H)$—$NH_2$, and $H_2N$—$CH_2$—$CH_2$—$NH$—$CH_2$—$CH_2$—$CO_2Na$.

Typical sulfonate groups for incorporation into the polyurethanes include diol sulfonates described in U.S. Pat. No. 4,108,814. Suitable diol sulfonate compounds also include hydroxyl terminated copolyethers comprising repeat units derived from the reaction of a diol and a sulfonated dicarboxylic acid. Specifically, the sulfonated dicarboxylic acid is 5-sulfo-isophthalic acid and the diol is 1,3-propanediol. Other suitable sulfonates include the ones represented by formula $H_2N$—$CH_2$—$CH_2$—$NH$—$(CH_2)_r$—$SO_3Na$, wherein r is 2 or 3.

When the ionic stabilizing groups are acids, the acid groups are incorporated in an amount sufficient to provide an acid group content for the polyurethane, known by those skilled in the art as acid number (mg KOH per gram solid polymer), of at least 6, typically at least 10, and even more typically 20 milligrams KOH per 1.0 gram of polyurethane. The upper limit for the acid number (AN) is about 120, and typically about 100.

Within the context of this disclosure, the term "neutralizing agents" is meant to embrace all types of agents which are useful for converting potentially ionic or ionizable groups to ionic groups. When amines are used as the neutralizing agent, the chain terminating reaction producing the urea termination is typically completed prior to the addition of the neutralizing agent that can also act as an isocyanate reactive group.

In order to convert an anionic group to its salt form before, during or after its incorporation into a prepolymer, either volatile or nonvolatile basic materials may be used to form the counterion of the anionic group. Volatile bases are those wherein at least about 90% of the base used to form the counterion of the anionic group volatilizes under the conditions used to remove water from the aqueous polyurethane dispersions. Nonvolatile bases are those wherein at least about 90% of the base does not volatilize under the conditions used to remove water from the aqueous polyurethane dispersions.

Suitable volatile basic organic compounds for neutralizing the potential anionic groups are the primary, secondary or tertiary amines. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethyl-ethanol amine, triethanolamine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone.

Suitable nonvolatile bases include alkoxides, hydroxides, carbonates or bicarbonates of monovalent metals, especially the alkali metals, lithium, sodium and potassium. When the anionic groups on the polyurethane are neutralized, they provide hydrophilicity to the polymer and better enable it to stably disperse pigment in water. However, it may be desirable to control the degree of neutralization. When the anionic groups on the polyurethane are partially neutralized, the polyurethane becomes more hydrophobic and therefore adsorbs onto the pigment surface.

The aqueous dispersing moiety on $R^2$ also includes nonionic groups such as glycols or polyethylene glycols. $R^2$ may contain ionic and non-ionic group alone or in combination.

Each $R^3$ of $Q^2$ in Formula (II) comes from a diol HO—$R^3$—OH and is independently $C_9$-$C_{20}$ alkyl, $C_9$-$C_{20}$ alkyl substituted by $C_1$-$C_{10}$ alkyl or $C_6$-$C_{15}$ aryl; $C_9$-$C_{40}$ aryl or $C_9$-$C_{40}$ aryl substituted by $C_1$-$C_{10}$ alkyl or $C_6$-$C_{20}$ aryl, —$(R^{11}$—O—$R^{10}$—O—$R^{11})$—; or HO—$R^3$—OH is a diol incorporating polyether, polyester, polycarbonate, polycarbonate-co-polyester or acrylic. HO—$R^3$—OH is hydrophobic in that it does not contain any hydrophilic substituent. Diol HO—$R^3$—OH where $R^3$ is $C_9$-$C_{20}$ alkyl, $C_9$-$C_{20}$ alkyl substituted by $C_1$-$C_{10}$ alkyl of $C_6$-$C_{15}$ aryl; $C_9$-$C_{40}$ aryl or $C_9$-$C_{40}$ aryl substituted by $C_1$-$C_{10}$ alkyl or $C_6$-$C_{20}$ aryl, or —$(R^{11}$—O—$R^{10}$—O—$R^{11})$— is either available from commercial sources or can be readily prepared by methods familiar to one of ordinary skill in the art.

Diol HO—$R^3$—OH where $R^3$ is polyester includes reaction products of dihydric alcohols and polybasic (typically dibasic) carboxylic acids. Instead of these polycarboxylic acids, the corresponding carboxylic acid anhydrides, or polycarboxylic acid esters of lower alcohols, or mixtures thereof may be used for preparing the polyesters.

The polycarboxylic acids may be aliphatic, cycloaliphatic, aromatic or heterocyclic or mixtures thereof and they may be substituted, for example, by halogen atoms, or unsaturated. The following are mentioned as examples: succinic acid, adipic acid, suberic acid, azelaic acid, sebacic acid, 1,12-dodecyldioic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids, dimethyl terephthalates and bis-glycol terephthalate.

Diol HO—$R^3$—OH where $R^3$ is polycarbonate, polycarbonate-co-polyester and acrylic includes those known, such as the products obtained from the reaction of diols such as propanediol-(1,3), butanediol-(1,4) or hexanediol-(1,6), diethylene glycol, triethylene glycol or tetraethylene glycol, and higher polyether diols with phosgene, diarylcarbonates such as diphenylcarbonate, dialkylcarbonates such as diethylcarbonate, or with cyclic carbonates such as ethylene or propylene carbonate. Also suitable are polyester carbonates obtained from the above-mentioned polyesters or polylactones with phosgene, diaryl carbonates, dialkyl carbonates or cyclic carbonates.

Poly(meth)acrylates containing hydroxyl groups include those common in the art of addition polymerization such as cationic, anionic and radical polymerization and the like. Examples are alpha-omega diols. An example of these type of diols are those which are prepared by a "living" or "control" or chain transfer polymerization processes which enables the placement of one hydroxyl group at or near the termini of the polymer. For further examples of making these diols, see: U.S. Pat. Nos. 6,248,839 and 5,990,245.

Each $R^4$ of $Q^3$ in Formula IV comes from a diol HO—$R^4$—OH is independently $C_1$-$C_7$ alkyl, $C_3$-$C_{20}$ alkyl substituted by $C_1$-$C_{10}$ alkyl of $C_6$-$C_{15}$ aryl; $C_6$-$C_{40}$ aryl or $C_9$-$C_{40}$ aryl substituted by $C_1$-$C_{10}$ alkyl or $C_6$-$C_{20}$ aryl, provided that the backbone atoms on $R^4$ between the two hydroxyl groups are less than 8. HO—$R^4$—OH is hydrophobic in that it does not contain any hydrophilic substituent. Furthermore, the short backbone of $R^4$ creates an ideal hard segment for the polyurethane dispersants of the present disclosure. Diol HO—$R^4$—OH is either available from commercial sources or can be readily prepared by methods familiar to one of ordinary skill in the art Diisocyanate OCN—$R^1$—NCO Diisocyanate OCN—$R^1$—NCO where $R^1$ is C1-C20 alkyl, $C_3$-$C_{20}$ substituted alkyl, $C_3$-$C_{10}$ cycloalkyl, $C_3$-$C_{20}$ substituted cycloalkyl, $C_6$-$C_{40}$ aryl or $C_9$-$C_{40}$ substituted aryl is either available from commercial sources or can be readily prepared by methods familiar to one of ordinary skill in the art. Examples of suitable diisocyanates include, but are not limited to, 2,4-toluene diisocyanate (2,4-TDI); 2,6-toluene diisocyanate (2,6-TDI); trimethyl hexamethylene diisocyanate (TMDI); 4,4'-diphenylmethane diisocyanate (MDI); 4,4'-dicyclohexylmethane diisocyanate ($H_{12}$MDI); 3,3'-dimethyl-4,4'-biphenyl diisocyanate (TODI); Dodecane diisocyanate ($C_{12}$DI); m-tetramethylene xylylene diisocyanate (TMXDI); 1,4-benzene diisocyanate; trans-cyclohexane-1, 4-diisocyanate; 1,5-naphthalene diisocyanate (NDI); 1,6-hexamethylene diisocyanate (HDI), 4,6-xylyene diisocyanate; and isophorone diisocyanate (IPDI).

Ratios of Polyurethane Components

For the polyurethane described above, the ratio of diisocyanate to diol is typically greater than 1:1, and more typically from about 1.05:1 to about 1.5:1. This ratio is critical in ensuring that the prepolymer formed has an isocyanate group at each end. A capping agent, selected from the group consisting of $R^6CHR^7OH$, $R^6CHR^7SH$, $R^7R^8NH$, and epoxide $CH_2OCR^7R^8$ is used to convert the prepolymer to the final polyurethane product.

The amount of the capping agent employed should be approximately equivalent to the unreacted isocyanate groups in the prepolymer. The ratio of active hydrogens from amine groups in the chain terminator to isocyanate groups in the prepolymer are in the range from about 1.0:1 to about 1.2:1, typically from about 1.0:1.1 to about 1.1:1, and more typically from about 1.0:1.05 to about 1.1:1, on an equivalent basis.

Alcohols $R^5CHR^6OH$, primary or secondary monoamines $R^6R^7NH$ are commonly used as the capping agents. Example of monoamines useful as chain terminators include but are not restricted to butylamine, hexylamine, 2-ethylhexyl amine, dodecyl amine, diisopropanol amine, stearyl amine, dibutyl amine, dinonyl amine, bis(2-ethylhexyl) amine, diethylamine, bis(methoxyethyl)amine, N-methylstearyl amine, diethanolamine and N-methyl aniline.

Pigments

A wide variety of organic and inorganic pigments, alone or in combination, may be dispersed with the polyurethane dispersant to prepare an ink, especially an ink-jet ink. The term "pigment" as used herein means an insoluble colorant that requires to be dispersed with a dispersant and processed under dispersive conditions in the presence of a dispersant. The colorant also includes dispersed dyes. The dispersion process results in a stable dispersed pigment. The pigment used with the inventive polyurethane dispersants also includes self-dispersed pigments. The pigment particles are sufficiently small to permit free flow of the ink through the ink-jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Typically, the pigment particle size should range from about 0.005 to about 5 micron and, most typically, from about 0.005 to about 1 micron. The average particle size as measured by dynamic light scattering is less than about 500 nm, typically less than about 300 nm.

The selected pigment(s) may be used in dry or wet form. For example, pigments are usually manufactured in aqueous media, and the resulting pigments are obtained as a water-wet presscake. In presscake form, the pigment does not agglomerate to the extent like it is in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and ZnO; and black pigment carbon black. The pigment names and abbreviations used herein are the "C.I." designation for pigments established by Society of Dyers and Colourists, Bradford, Yorkshire, UK and published in *The Color Index*, Third Edition, 1971.

In the case of organic pigments, the ink may contain up to approximately 30%, typically from 0.1% to about 25%, and more specifically from 0.25% to 10% of pigment, by weight based on the total ink weight. If an inorganic pigment is selected, the ink will tend to contain higher percentages by weight of pigment than with comparable inks employing organic pigment, since inorganic pigments generally have higher densities than organic pigments.

The polyurethane polymer dispersant is typically present in the range of from 0.1% to 20%, and more specifically from 0.2% to about 10%, by weight based on the weight of the total ink composition.

Proportion of Main Ingredients

The pigment levels employed in the instant inks are those levels which are typically needed to impart the desired color density to the printed image. Typically, pigment levels are in the range of about 0.05 to about 10%, based on the total weight of the ink. The amount of the polyurethane dispersant required to stabilize a pigment is dependent upon the specific polyurethane dispersant, the pigment and their interaction with the ink vehicle interaction. The weight ratio of pigment to the polyurethane dispersant typically ranges from about 0.5 to about 6.

Preparation of the Pigment Dispersion

The pigmented dispersions used in this invention can be prepared using any conventional milling process known in the art. Most milling processes use a two-step process involving a first mixing step followed by a second grinding step. The first step comprises mixing of all the ingredients, that is, pigment, dispersants, liquid carriers, neutralizing agent and any optional additives to provide a blended "premix". Typically all liquid ingredients are added first, followed by the dispersants, and lastly the pigment. Mixing is generally done in a stirred mixing vessel, and a high-speed disperser (HSD) is particularly suitable for the mixing step. A Cowels type blade attached to the HSD and operated at from 500 rpm to 4000 rpm, and more typically from 2000 rpm to 3500 rpm, provides optimal shear to achieve the desired mixing. Adequate mixing is usually achieved after mixing under the conditions described above for a period of from 15 to 120 minutes.

The second step comprises grinding of the premix to produce a pigmented dispersion. Typically, grinding involves a media milling process, although other milling techniques can also be used. In the present invention, a lab-scale Eiger Minimill (Model M250, VSE EXP) manufactured by Eiger Machinery Inc., Chicago, Ill. is employed. Grinding was accomplished by charging about 820 grams of 0.5 YTZ® zirconia media to the mill. The mill disk is operated at a speed between 2000 rpm and 4000 rpm, and typically between 3000 rpm and 3500 rpm. The dispersion is processed using a re-circulation grinding process with a typical flow rate through the mill at between 200 to 500 grams/minute, and more typically at 300 grams/minute. The milling may be done using a staged procedure in which a fraction of the solvent is held out of the grind and added after milling is completed. This is done to achieve optimal rheology that maximizes grinding efficiency. The amount of solvent held out during milling varies by dispersion, and is typically between 200 to 400 grams for a batch size with a total of 800 grams. Typically, the dispersions of the present invention are subjected to a total of 4 hours of milling.

For black dispersions, an alternate milling process using a Microfluidizer can be used. Microfluidization is a non-media milling process in which milling is done by pigment impingement through nozzles under high pressures. Typically, pigment dispersions are processed at 15,000 psi with a flow rate of 400 grams/minute for a total of 12 passes through the mill. In making the black dispersions in the Examples, a lab-scale (Model M-110Y, available from Microfluidics of Newton, Mass.) high pressure pneumatic Microfluidizer with a diamond Z Chamber was employed.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Ink Vehicle

The pigmented ink of this disclosure comprises an ink vehicle typically an aqueous ink vehicle, also known as aqueous vehicle or aqueous carrier medium, the aqueous dispersion and optionally other ingredients.

The ink vehicle is the liquid carrier (or medium) for the aqueous dispersion(s) and optional additives. The term "aqueous vehicle" refers to a vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, Sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from 30% water and 70% diethylene glycol to 95% water and 5% diethylene glycol, more typically from 60% water and 40% diethylene glycol to 95% water and 5% diethylene glycol. Percentages are based on the total weight of the ink vehicle. A mixture of water and butyl carbitol is also an effective ink vehicle.

The amount of ink vehicle in the ink is typically in the range of from 70% to 99.8%, and more typically from 80% to 99.8%, by weight based on total weight of the ink.

The ink vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Typical 1,2-alkanediols are $C_4$-$C_6$ alkanediols with 1,2-hexanediol being most typical. Suitable surfactants include ethoxylated acetylene diols (e.g. Surfynol® series commercially available from Air Products), ethoxylated alkyl primary alcohols (e.g. Neodol® series commercially available from Shell) and secondary alcohols (e.g. Tergitol® series commercially available from Union Carbide), sulfosuccinates (e.g. Aerosol® 9 series commercially available from Cytec), organosilicones (e.g. Silwet® g series commercially available from Witco) and fluoro surfactants (e.g. Zonyl® series commercially available from DuPont).

The amount of glycol ether(s) and 1,2-alkanediol(s) added is typically in the range of from 1% to 15%, and more typically from 2% to 10% by weight, based on the total weight of the ink. Surfactants may be used, typically in the amount of from 0.01% to 5% and more typically from 0.2% to 2%, by weight based on the total weight of the ink.

Additives

Other ingredients, additives, may be formulated into the inkjet ink, to the extent that such other ingredients do not interfere with the stability and jettability of the inkjet ink. This may be readily determined by routine experimentation by one skilled in the art.

Surfactants are commonly added to inks to adjust surface tension and wetting properties. Suitable surfactants include the ones disclosed in the "Vehicle" section above. Surfactants are typically used in amounts up to about 5% and more typically in amounts up to 2%, by weight based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or non-ionic. Soluble polymers include linear homopolymers and copolymers or block polymers. They can also be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. The polymers may be made by a solution, emulsion, or suspension polymerization process. Preferred classes of polymer additives include anionic acrylic, styrene-acrylic and polyurethane polymer.

When a polymer is present, the polymer level is typically between about 0.01% and about 3%, by weight based on the total weight of an ink. The upper limit is dictated by ink viscosity or other physical limitations.

Biocides may be used to inhibit growth of microorganisms.

Pigmented ink jet inks typically have a surface tension in the range of about 20 mN·m$^{-1}$ to about 70 mN·m$^{-1}$, at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not to clog to a significant extent in an ink jet apparatus. Further, the ink should not corrode parts of the ink jet printing device it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even more advantageously, less than about 3.5 mPa·s The following examples illustrate the invention without, however, being limited thereto.

EXAMPLES

Particle Size Measurements

The particle size for the polyurethane resins, pigments and the inks were determined by dynamic light scattering using a Microtrac®, UPA 150 analyzer from Honeywell/Microtrac (Montgomeryville, Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to derive the particle size distribution. Results are reported as Mv, Mn, D50 and D95.

Solid Content Measurement

For polyurethane resins containing a high boiling solvent, e.g., sulfolane, tetraglyme (tetraethylene glycol dimethyl ether), the solid content was determined by the weight difference before and after baking overnight (~16 hours) in an oven set at 120° C. under a vacuum of 20 inch Hg.

Polymerization Equipment

A glass reactor kettle was use for each polymerization. Its size varies depending on volume of resin prepared, but generally ranges from 1000 mL to 4000 mL. Each reactor is heated with an electric heating mantle, and is equipped with the following attachments properly sized for the reactor to assure proper mixing and process control. These attachments include a reflux condenser, a nitrogen inlet to provide a static head of nitrogen gas, a 45 degree pitched 4 blade turbine on an agitator shaft driven by an electric motor, a thermocouple and an addition funnel.

Extent of Polyurethane Reaction

The extent of polyurethane reaction was determined by a titration with dibutylamine to detect the isocyanate content (NCO %), a common method used in urethane chemistry.

With this method, a sample of the isocyanate containing prepolymer is reacted with a known amount of dibutylamine solution, and the residual amine is back titrated with aqueous HCl.

Example 1

Control Using IPDI, 100% T650, DMPA, BMEA-KOH, AN53

To a 2000 mL reactor were charged 219.10 g of Terathane® 650, 63.1 g of DMPA, 0.31 g of DBTDL and 285.53 g of tetraglyme solvent. The reactor was heated to 70° C. While stirring 192.65 g of IPDI was added over 45 minutes followed by rinsing the additional funnel with 36.43 g of solvent. The reactor temperature was adjusted to 80° C. after exotherm and the % NCO was check hourly until it reached 0.99% (target=0.65%). To the reactor was added 16.49 g of BMEA over 10 minutes. The reaction was held at 80° C. for 1 hr. The polyurethane solution was inverted under high speed mixing by adding 55.77 g of aqueous 45% KOH solution followed by 1130.57 g of de-ionized water. The polyurethane solution had a measured solid content of 24.9% and a Mn of 8730.

Examples 2

IPDI, 95% 3G, 5% 1,2 Propane Diol, DMPA, BMEA-KOH, AN45

To a 4000 mL reactor were charged 87.5 g of 3G, 4.6 g 1.2 propane diol, 59.81 g of DMPA, 0.08 g of DBTDL and 300.1 g of tetraglyme solvent. The reactor was heated to 40° C. with agitation until solution was clear. To the reactor was added 404.4 g of IPDI via an additional funnel over a period of 60 minutes. The residual IPDI in the addition funnel was rinsed into the reactor with 9.3 g of tetraglyme solvent. The reaction temperature was maintained below 50° C. during the exotherm and held at 50° C. until the measured % NCO reached 1.64% (target=1.61%). The polymerization was then terminated by the addition of 43.2 g of BMEA. Following a 60 minute hold, 55.5 g of a 45% KOH in water solution was added followed by 1524.0 g de-ionized water. This inverted polyurethane solution was 100% neutralized with KOH. Heating and agitation were continued at 50° C. for an additional 60 minutes before cooling and fillout. The resulting polymer solution had a solid content of 27.12% and a Mn of 3818.

Examples 3

IPDI, 95% 3G, 5% 1,2 Propane Diol, DMPA, Dibutyl Amine-KOH, AN45

To a 4000 mL reactor were added 87.5 g of 3G, 4.6 g 1,2 propane diol, 59.81 g of DMPA, 0.07 g of DBTDL and 300.0 g of tetraglyme solvent. The reactor was heated to 40° C. with agitation until the solution was clear. To the reactor was added 404.4 g of IPDI via an additional funnel over a period of 60 minutes. The residual IPDI in the addition funnel was rinsed into the reactor with 9.5 g of tetraglyme solvent. The reaction temperature was maintained below 53° C. during the exotherm and held at 50° C. until the measured % NCO reached 1.56% (target=1.57%). The polymerization was then terminated by the addition of 42.7 g of dibutylamine. Following a 60 minute hold, 55.55 g of aqueous 45% KOH solution was added followed by 1560.0 g de-ionized water. This inverted polyurethane solution was 100% neutralized with KOH. Heating and agitation were continued at 50° C. for an additional 60 minutes before cooling and fillout. The resulting polymer solution had a solid content of 25.95% and a Mn of 6778.

Examples 4

IPDI, 50% 3G, 50% HQEE, DMPA, BMEA-KOH, AN40

To a 2000 mL reactor were added 85.21 g of HQEE, 32.70 g of 3G, 41.14 g of DMPA, 0.0545 g DBTL and 488.4 g tetraglyme solvent. The reactor was heated to 80° C. with agitation. To the reactor was added 271.5 g of IPDI via an additional funnel over a period of 30 minutes. The residual IPDI in the addition funnel was rinsed into the reactor with 7.2 g of tetraglyme solvent. The reaction temperature was allowed to rise to 88.9° C. during the exotherm. The reactor temperature was lowered to 80° C. and maintained there until the measured % NCO reached 0.55% (target=0.50%). The polymerization was then terminated by the addition of 13.6 g of BMEA. Following a 60 minute hold, 38.2 g of aqueous 45% KOH solution was added followed by 872.8 g de-ionized water. This inverted polyurethane solution was 100% neutralized with KOH. Heating and agitation were continued at 80° C. for an additional 60 minutes before cooling and fillout. The resulting polymer solution had a solid content of 27.04% and a Mn of 6212.

Examples 5

IPDI, 50% 3G, 50% HQEE, DMPA, BMEA-KOH, AN50

To a 2000 mL reactor were added 62.20 g of HQEE, 23.94 g of 3G, 43.15 g of DMPA, 0.046 g DBTL and 280.77 g tetraglyme solvent. The reactor was heated to 80° C. with agitation. To the reactor was added 232.0 g of IPDI via an additional funnel over a period of 30 minutes. The residual IPDI in the addition funnel was rinsed into the reactor with 9.1 g of tetraglyme solvent. The reaction temperature was allowed to rise to below 95° C. during the exotherm. The reactor temperature was lowered to 80° C. and maintained there until the measured % NCO reached 1.11% (target=1.22%). The polymerization was then terminated by the addition of 25.30 g of BMEA followed by rinsing the additional funnel with 5.70 g of tetraglyme. Following a 60 minute hold, 40.06 g of aqueous 45% KOH solution was added followed by 896.0 g de-ionized water. This inverted polyurethane solution was 100% neutralized with KOH. Heating and agitation were continued at 80° C. for an additional 60 minutes before cooling and fillout. The resulting polymer solution had a solid content of 25.07% and a Mn of 7044.

Examples 6

IPDI, 30% 3G, 70% HQEE, DMPA, BMEA-KOH, AN45

To a 4000 mL reactor were added 127.00 g of HQEE, 20.93 g of 3G, 57.34 g of DMPA, 0.06 g DBTL and 414.7 g tetraglyme solvent. The reactor was heated to 40° C. with agitation until the solution inside the reactor was clear. To the reactor was added 328.19 g of IPDI via an additional funnel over a period of 60 minutes. The residual IPDI in the addition funnel was rinsed into the reactor with 21.93 g of tetraglyme solvent. The reaction temperature was maintained at below 80° C. during the exotherm and at 80° C. until the measured % NCO reached 1.15% (target=1.16%). The polymerization was then terminated by the addition of 35.35 g of BMEA followed by rinsing the additional funnel with 12.51 g of tetraglyme. Following a 60 minute hold, 53.25 g of aqueous 45% KOH solution was added followed by 1300.0 g de-ionized water. This inverted polyurethane solution was 100% neutralized with KOH. Heating and agitation were continued at 80° C. for an additional 60 minutes before cooling and fillout. The resulting polymer solution had a solid content of 26.72% and a Mn of 5987.

Examples 7

IPDI, 30% 3G, 70% HQEE, DMPA, BMEA-KOH, AN50

To a 2000 mL reactor were added 96.03 g of Hydroquinone bis(2-hydroxyethyl)ether (HQEE), 15.82 g of 1,3 propane diol (3G), 50.64 g of dimethylol propionic acid (DMPA), 0.043 g dibuyltindilaurate (DBTDL) and 329.61 g tetraglyme solvent. The reactor was heated to 80° C. with agitation. To the reactor was added 261.54 g of IPDI via an additional funnel over a period of 30 minutes. The residual IPDI in the addition funnel was rinsed into the reactor with 17.35 g of tetraglyme solvent. The reaction temperature was allowed to rise to below 95° C. during the exotherm. The reactor temperature was lowered to 80° C. and maintained there until the measured % NCO reached 1.06% (target=1.17%). The polymerization was then terminated by the addition of 25.88 g of BMEA. Following a 60 minute hold, 47.03 g of aqueous 45% KOH solution was added in one shot followed by 1140.0 g de-ionized water with agitation. This inverted polyurethane solution was 100% neutralized with KOH. Heating and agitation were continued at 80° C. for an additional 60 minutes before cooling and fillout. The resulting polymer solution had a solid content of 26.83% and a Mn of 5969.

Examples 8

IPDI, 30% 3G, 70% HQEE, DMPA, BMEA-KOH, AN55

To a 4000 mL reactor were added 206.93 g of hydroquinone bis(2-hydroxyethyl)ether (HQEE), 34.10 g of 1,3 propane diol (3G), 120.63 g of dimethylol propionic acid (DMPA), 0.101 g dibuyltindilaurate (DBTL) and 698.69 g of tetraglyme solvent. The reactor was heated to 80° C. with agitation. To the reactor was added 556.60 g of IPDI via an additional funnel over a period of 30 minutes. The residual IPDI in the addition funnel was rinsed into the reactor with 37.90 g of tetraglyme solvent. The reaction temperature was allowed to rise to below 95° C. during the exotherm. The reactor temperature was lowered to 80° C. and maintained there until the measured % NCO reached 0.58% (target=0.58%). The polymerization was then terminated by the addition of 30.50 g of BMEA via an additional funnel followed by rinsing the additional funnel with 15.52 g of tetraglyme solvent. Following a 60 minute hold, 112.07 g of aqueous 45% KOH solution was added in one shot followed by 2188.1 g of de-ionized water with agitation. This inverted polyurethane solution was 100% neutralized with KOH. Heating and agitation were continued at 80° C. for an additional 60 minutes before cooling and fillout. The resulting polymer solution had a solid content of 25.91% and a Mn of 8526.

Examples 9

IPDI, 30% 3G, 70% Stepan PS3152 Diol, DMPA, Morpholine-KOH, AN55

To a 2000 mL reactor were added 99.75 g of Stepan PS 3152, 11.36 g of 3G, 45.76 g of DMPA and 265.08 g of tetraglyme solvent. The reactor was heated to 80° C. with agitation until the solution inside the reactor was clear. To the reactor was added 191.78 g of IPDI via an additional funnel over a period of 60 minutes. The residual IPDI in the addition funnel was rinsed into the reactor with 15.14 g of tetraglyme solvent. The reaction temperature was allowed to rise to below 90° C. during the exotherm. The reactor temperature was lowered to 80° C. and maintained there for 60 minute after the addition of IPDI was completed. To the reactor was added 0.07 g of DBTDL, and the % NCO was monitored until it reached 0.31% (target=0.31%). The polymerization was then terminated by the addition of 4.18 g of morpholine followed by rinsing the additional funnel with 6.26 g of tetraglyme solvent. Following a 60 minute hold, 40.41 g of aqueous 45% KOH solution was added in one shot followed by 810.51 g of de-ionized water with agitation. This inverted polyurethane solution was 95% neutralized with KOH. Heating and agitation were continued at 50° C. for an additional 60 minutes before cooling and fillout. The resulting polymer solution had a solid content of 25.27% and a Mn of 8113.

Examples 10

IPDI, 30% 3G, 70% HQEE, DMPA, BMEA-LiOH, AN55

To a 2000 mL reactor were added 81.02 g of HQEE, 13.30 g of 3G, 47.21 g of DMPA, 0.053 g of DBTL and 273.79 g of tetraglyme solvent. The reactor was heated to 80° C. with agitation. The reactor was heated to 80° C. with agitation. To the reactor was added 218.1 g of IPDI via an additional funnel over a period of 30 minutes. The residual IPDI in the addition funnel was rinsed into the reactor with 16.21 g of tetraglyme solvent. The reaction temperature was allowed to rise to below 95° C. during the exotherm. The reactor temperature was lowered to 80° C. and maintained there until the measured % NCO reached 0.65% (target=0.58%). The polymerization was then terminated by the addition of 13.34 g of BMEA followed by rinsing the residual BMEA in the additional funnel into the reactor with 6.73 g of tetraglyme solvent. Following a 60 minute hold, a solution of 8.40 g of LiOH in 825.8 g of de-ionized water was added to the reactor to neutralize and invert the resin. This inverted polyurethane solution was 100% neutralized with LiOH. Heating and agitation were continued at 80° C. for an additional 60 minutes before cooling and fillout. The resulting polymer solution had a solid content of 26.36% and a Mn of 8990.

Examples 11

IPDI, 30% 3G, 70% HQEE, DMPA, Morpholine-LiOH, AN45

To a 2000 mL reactor were added 89.59 g of HQEE, 14.75 g of 3G, 38.77 g of DMPA, 0.165 g of DBTL and 274.50 g of tetraglyme solvent. The reactor was heated to 80° C. with agitation. To the reactor was added 217.60 g of IPDI via an additional funnel over a period of 60 minutes. The residual IPDI in the addition funnel was rinsed into the reactor with 15.1 g of tetraglyme solvent. The reaction temperature was allowed to rise to below 100° C. during the exotherm. The reactor temperature was then set to 100° C. and maintained there until the measured % NCO reached 0.58% (target=0.58%). The polymerization was then terminated by the addition of 7.90 g of morpholine followed by rinsing the residual morpholine in the additional funnel into the reactor with 6.60 g of tetraglyme. Following a 60 minute hold, a solution of 11.53 g of LiOH in 1225.0 g of de-ionized water was added to the reactor to neutralize and invert the resin. This inverted polyurethane solution was 95% neutralized with LiOH. Heating and agitation were continued at 80° C. for an additional 60 minutes before cooling and fillout. The resulting polymer solution had a solid content of 20.52% and a Mn of 7884.

Preparation of Inks and Testing of Durability

Inkjet inks were prepared using a black Self-Dispersed Pigment (SDP) as colorant and a polyurethane binder (1 through 11) for improving print durability on various media.

Each ink was printed on various paper media and the print was assessed for Optical Density (OD), highlighter fastness and smudge durability.

Inks Containing Binders from Examples 1-11

Inks 1-11 were prepared by conventional processes known to one skilled in the art using an aqueous dispersion containing a SDP and a polyurethane binder from Examples 1-11. Control Ink-1, where the binder does not contain additional 'hard segment', was also prepared using the polyurethane in Example 1. The inks were processed by routine operations suitable for ink-jet ink formulation.

The ink ingredients are listed in Table 1 below. All ingredients, except the self-dispersed carbon black dispersion, were first mixed together, and the pigment dispersion was then added slowly with continuous mixing. The contents of pigment and binder were designed to be 3.0% and 2.0% by weight, respectively, in the final ink.

TABLE 1

| Ink Ingredients | % (by weight in Ink) |
|---|---|
| 2-Pyrrolidone | 12.5 |
| Dantocol DHE | 9.0 |
| Oleic acid | 0.15 |
| Surfynol 465 | 0.20 |
| Proxel GXL | 0.17 |
| DuPont SDP black | 3.0 |
| Resin Solution | 2.0 |
| De-ionized water | Balance to 100% |

Inks 1-11 were printed on various paper media using a Hewlett-Packard model 96 printer. The optical density (OD) and Durability of the printed pigmented ink with binder were measured and summarized in Table 2.

TABLE 2

| | | HP Multipurpose paper (HPMP) | | | | HP Brochure paper (HPB) | | |
|---|---|---|---|---|---|---|---|---|
| | | | Faber Castel HiLite[#] 1 h 1 Kg manual | | Dry Smudge* | | Faber Castel HiLite[#] 1 h 1 Kg manual | Dry Smudge* |
| Example | OD | 1X | 2X | 1 h | OD | 1X | 2X | 1 h |
| Control 1 | 1.31 | 2.9 | 1.4 | 3.1 | 1.67 | 1.6 | 0.5 | 3.9 |
| 2 | 1.39 | 3.0 | 1.5 | 3.5 | 1.65 | 4.5 | 3.5 | 5.0 |
| 3 | 1.37 | 3.5 | 1.5 | 1.5 | 1.65 | 5.0 | 4.5 | 4.5 |
| 4 | 1.38 | 3.0 | 1.5 | 2.5 | 1.67 | 4.0 | 2.0 | 4.5 |
| 5 | 1.39 | 3.0 | 1.0 | 3.0 | 1.67 | 2.0 | 0.5 | 4.0 |
| 6 | 1.35 | 3.1 | 1.5 | 2.9 | 1.68 | 4.0 | 2.5 | 4.3 |
| 7 | 1.38 | 3.0 | 1.5 | 2.5 | 1.67 | 2.5 | 1.0 | 3.0 |
| 8 | 1.41 | 3.0 | 1.5 | 3.0 | 1.72 | 2.0 | 0.5 | 4.0 |
| 9 | 1.30 | 3.5 | 1.5 | 3.0 | 1.64 | 4.0 | 1.0 | 4.0 |
| 10 | 1.40 | 3.0 | 1.5 | 3.0 | 1.70 | 3.0 | 1.0 | 4.5 |
| 11 | 1.35 | 3.5 | 1.5 | 3.0 | 1.65 | 5.0 | 4.5 | 5.0 |

*Visual Rating for Smudge
0—Ink largely removed
2—Severe smudge
3—Moderate smudge
4—Very slight smudge
5—No smudge visible
[#]Visual Rating for Highlighter Smear
0—Ink largely removed from stripe with highlighter
1—Severe smear, considerable color transfer, may be some damage to stripe
2—Noticeable smear, run full width of area between stripes
3—Moderate smear, may be full width of highlighter, but light in color
4—Slight smear, narrow, doesn't run clear to next stripe
5—No smear visible Examples 12

TMXDI, 30% 3G, 70% HQEE, DMPA, BMEA-KOH, AN45

To a 2000 mL reactor were added 79.00 g of HQEE, 13.0 g of 3G, 38.2 g of DMPA, 0.03 g of DBTDL and 270.3 g of tetraglyme solvent. The reactor was heated to 80° C. with agitation. The reactor was heated to 80° C. with agitation. To the reactor was added 225.0 g of TMXDI via an additional funnel over a period of 30 minutes. The residual TMXDI in the addition funnel was rinsed into the reactor with 14.50 g of tetraglyme solvent. The reaction temperature was allowed to rise to below 90° C. during the exotherm. The reactor temperature was lowered to 80° C. and maintained there until the measured % NCO reached 0.93% (target=0.88%). The polymerization was then terminated by the addition of 18.9 g of BMEA followed by rinsing the residual BMEA in the additional funnel into the reactor with 5.8 g of tetraglyme solvent. Following a 60 minute hold, 35.5 g of aqueous 45% KOH solution was added in one shot followed by 800.7 g of de-ionized water with agitation. This inverted polyurethane solution was 100% neutralized with KOH. Heating and agitation were continued at 80° C. for an additional 60 minutes before cooling and fillout. The resulting polymer solution had a solid content of 24.00% and a Mn of 4873.

Examples 13

TMXDI, 30% 3G, 70% HQEE, DMPA, Tripropylene Glycol-KOH, AN45

To a 2000 mL reactor were added 77.31 g of HQEE, 12.74 g of 3G, 36.37 g of DMPA, 0.038 g of DBTDL and 257.54 g of tetraglyme solvent. The reactor was heated to 80° C.

with agitation. To the reactor was added 212.03 g of TMXDI via an additional funnel over a period of 30 minutes. The residual TMXDI in the addition funnel was rinsed into the reactor with 14.51 g of tetraglyme solvent. The reaction temperature was allowed to rise to below 90° C. during the exotherm. The reactor temperature was lowered to 80° C. and maintained there until the measured % NCO reached 0.54% (target=0.54%). The polymerization was then terminated by the addition of 30.34 g of tripropylene glycol followed by rinsing the residual tripropylene glycol in the additional funnel into the reactor with 6.38 g of tetraglyme solvent. Following a 60 minute hold, 32.08 g of aqueous 45% KOH solution was added in one shot followed by 855.0 g of de-ionized water with agitation. This inverted polyurethane solution was 100% neutralized with KOH. Heating minutes later, 23.28 g of BMEA was added, followed by 1054.6 g of de-ionized water and rinsing with 6.38 g of tetraglyme. Following a 60 minutes hold, 32.08 g of aqueous 45% KOH was added followed by 855.0 g of de-ionized water. This inverted polyurethane solution was 100% neutralized with KOH. Heating and agitation were continued at 80° C. for an additional 60 minutes before cooling. The solution was very thick so additional water (500 g) was added to lower the solid content to roughly 20%. The resulting polymer solution had a solid content of 20.39% and a Mn of 9689.

Table 3 summarizes the print data from ink made with resins from Examples 12-14. As shown in Table 3, changes in diisocyanate and the terminating group impacted the OD and durability of the printed inks.

TABLE 3

| | | HP Multipurpose paper (HPMP) | | | | HP Brochure paper (HPB) | | | |
|---|---|---|---|---|---|---|---|---|---|
| | | | Faber Castel HiLite[#] 1 h | | | | Faber Castel HiLite[#] 1 h | | |
| | | | 1 Kg manual | | Dry Smudge* | | 1 Kg manual | | Dry Smudge* |
| Example | OD | 1X | 2X | 1 h | OD | IX | 2X | 1 h |
| Control | 1 | 1.31 | 2.9 | 1.4 | 3.1 | 1.67 | 1.6 | 0.5 | 3.9 |
| | 12 | 1.35 | 3.1 | 1.5 | 2.9 | 1.68 | 4.0 | 2.5 | 4.3 |
| | 13 | 1.35 | 2.5 | 1.3 | 3.0 | 1.8 | 1.0 | 0.0 | 4.0 |
| | 14 | 1.31 | 3.5 | 1.5 | 3.0 | 1.6 | 4.5 | 2.0 | 4.5 |

*Visual Rating for Smudge
0—Ink largely removed
2—Severe smudge
3—Moderate smudge
4—Very slight smudge
5—No smudge visible
[#]Visual Rating for Highlighter Smear
0—Ink largely removed from stripe with highlighter
1—Severe smear, considerable color transfer, may be some damage to stripe
2—Noticeable smear, run full width of area between stripes
3—Moderate smear, may be full width of highlighter, but light in color
4—Slight smear, narrow, doesn't run clear to next stripe
5—No smear visible and agitation were continued at 80° C. for an additional 60 minutes before cooling and fillout. The resulting polymer solution had a solid content of 23.94% and a Mn of 9012.

Examples 14

IPDI, 30% 3G, 70% HQEE, DMPA, Taurine/BMEA-KOH, AN45

To a 2000 mL reactor were added 107.58 g of HQEE, 17.72 g of 3G, 48.58 g of DMPA, 0.046 g of DBTDL and 351.31 g of tetraglyme solvent. The reactor was heated to 80° C. with agitation. To the reactor was added 278.09 g of IPDI via an additional funnel over a period of 30 minutes. The residual IPDI in the addition funnel was rinsed into the reactor with 18.49 g of tetraglyme solvent. The reaction temperature was allowed to rise to below 90° C. during the exotherm. The reactor temperature was lowered to 80° C. and maintained there until the measured % NCO reached 1.15%. The polymerization was then terminated by the addition of a solution containing 6.71 g of taurine, 5.20 g of aqueous 45% KOH and 50.02 g of de-ionized water. Fifteen Examples 15

TMXDI, 31% 3G, 69% HQEE, DMPA, Alendronic Acid-KOH, AN41.5/32.2

To a 1000 mL reactor were added 35.10 g of HQEE, 6.00 g of 3G, 15.00 g of DMPA, and 124.5 g of sulfolane solvent. The reactor was heated to 80° C. with agitation and when solution was clear the temperature was lowered to 60° C. and 4 drops DBTDL was added. To the reactor was added 95.2 g of TMXDI via an additional funnel over a period of 30 minutes. The residual TMXDI in the addition funnel was rinsed into the reactor with 15.2 g of sulfolane solvent. The reaction temperature was allowed to rise to below 100° C. during the exotherm. The reactor temperature was then set to 100° C. and maintained there until the measured % NCO reached 0.63%. The reaction temperature was lowered to 80° C., and a 330.5 g solution of 10.8 g of Alendronic acid, 24.73 g of aqueous 43% KOH in 288.88 g of de-ionized water was added to the reactor with vigorous agitation. This inverted polyurethane solution was 100% neutralized with KOH. The resulting polymer solution had Acid Numbers of 41.5 (COOH) and 32.3 (PO$_3$H), a solid content of 26.8% and a Mn of 5496.

Examples 16

TMXDI, 30% 3G, 70% HQEE, DMPA/Alendronic Acid-KOH, AN23/34

To a 1000 mL reactor is added 30.0 g of HQEE, 5.00 g of 3G, 6.00 g of DMPA, and 86.2 g sulfolane solvent. The reactor was heated to 80° C. with agitation and when solution was clear the temperature was lowered to 60° C. and 4 drops DBTDL were added. To the reactor was added 68.1 g of TMXDI via an additional funnel over a period of 30 minutes. The residual TMXDI in the addition funnel was rinsed into the reactor with 15.2 g of sulfolane solvent. The reaction temperature was allowed to rise to below 100° C. during the exotherm. The reactor temperature was then set to 100° C. and maintained there until the measured % NCO reached 0.52%. The reaction temperature was lowered to 80° C., and a 234.65 g solution of 8.27 g of Alendronic acid, 13.84 g of aqueous 43% KOH in 212.54 g of de-ionized water (heated to 60° C.) was added to the reactor with vigorous agitation. This inverted polyurethane solution was 100% neutralized with KOH and had a high viscosity. The resulting polymer solution had Acid Numbers of 23 (COOH) and 34 ($PO_3H$), a solid content of 21.60% and a Mn of 5408.

Table 4 summarizes the print data from inks made with resins from Examples 15-16.

TABLE 4

| | HP Multipurpose paper (HPMP) | | | | HP Brochure paper (HPB) | | | |
| | | Faber Castel HiLite# 1 h | | Dry Smudge* | | Faber Castel HiLite# 1 h | | Dry Smudge* |
| Example | OD | 1X | 2X | 1 h | OD | 1X | 2X | 1 h |
| --- | --- | --- | --- | --- | --- | --- | --- | --- |
| Control 1 | 1.31 | 2.9 | 1.4 | 3.1 | 1.67 | 1.6 | 0.5 | 3.9 |
| 8 | 1.41 | 3.0 | 1.5 | 3.0 | 1.72 | 2.0 | 0.5 | 4.0 |
| 15 | 1.34 | 4.3 | 2.3 | 3.3 | 1.74 | 4.8 | 4.0 | 4.5 |
| 16 | 1.23 | 4.3 | 2.0 | 3.0 | 1.54 | 5.0 | 4.8 | 4.5 |

*Visual Rating for Smudge
0—Ink largely removed
2—Severe smudge
3—Moderate smudge
4—Very slight smudge
5—No smudge visible
Visual Rating for Highlighter Smear
0—Ink largely removed from stripe with highlighter
1—Severe smear, considerable color transfer, may be some damage to stripe
2—Noticeable smear, run full width of area between stripes
3—Moderate smear, may be full width of highlighter, but light in color
4—Slight smear, narrow, doesn't run clear to next stripe
5—No smear visible

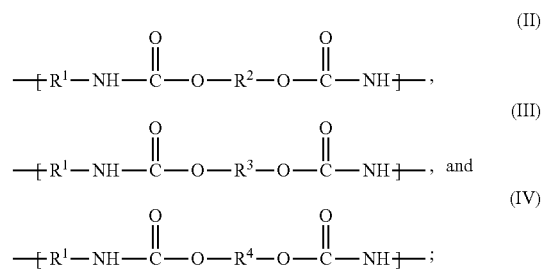

What is claimed is:
1. An aqueous ink-jet ink comprising an aqueous vehicle, a pigment and a random copolymer as a binder, wherein said random copolymer is derived from the polymerization of a diisocyanate with three or more diols including a first diol and a second diol, wherein said first diol contains one or more hydrophilic stabilizing groups, the number of backbone atoms on the chain between the two hydroxyl groups of said second diol is less than 8, and the mole % of said second diol relative to the total diols is at least 30%, said copolymer has a general structure of Formula I:

$$OCN\!\!-\!\!(Q^1)_n\!\!-\!\!(Q^2)_m\!\!-\!\!(Q^3)_p\!\!-\!\!R^1\!\!-\!\!NCO \qquad (I)$$

wherein the terminal isocyanate groups in said copolymer are capped with a capping agent; each $Q^1$, $Q^2$ and $Q^3$ is independently provided that $Q^1$, $Q^2$ and $Q^3$ contain at least one Formula II, at least one Formula III and at least one Formula IV groups;

each $R^1$ is $C_1$-$C_{20}$ alkylene, $C_3$-$C_{20}$ substituted alkylene, $C_3$-$C_{10}$ cycloalkylene, $C_3$-$C_{20}$ substituted cycloalkylene, $C_6$-$C_{40}$ arylene or $C_9$-$C_{40}$ substituted arylene from a diisocyanate;

each $R^2$ is independently $C_3$-$C_{20}$ substituted alkylene, $C_3$-$C_{20}$ substituted cycloalkylene or $C_9$-$C_{40}$ substituted arylene;

each $R^3$ is independently $C_9$-$C_{20}$ alkylene, $C_2$ alkylene substituted by $C_1$-$C_{10}$ alkyl, $C_9$-$C_{20}$ alkylene substituted by $C_1$-$C_{10}$ alkyl or $C_6$-$C_{15}$ aryl; $C_9$-$C_{40}$ arylene or $C_9$-$C_{40}$ arylene substituted by $C_1$-$C_{10}$ alkyl or $C_6$-$C_{20}$ aryl, —($R^{11}$—O—$R^{10}$—O—$R^{11}$)—; or HO—$R^3$—OH is a diol incorporating polyether, polyester, polycarbonate, polycarbonate-co-polyester or acrylic;

each $R^4$ is independently $C_1$-$C_7$ alkylene, $C_3$-$C_{20}$ alkylene substituted by $C_1$-$C_{10}$ alkyl of $C_6$-$C_{15}$ aryl; $C_6$-$C_{40}$ arylene or $C_9$-$C_{40}$ arylene substituted by $C_1$-$C_{10}$ alkyl or $C_6$-$C_{20}$ aryl, provided that the backbone atoms on $R^4$ forming a chain linking the two oxygen atoms in Formula IV are less than 8;

n, m and p are integers from 1 to 200;

said capping agent is $R^6R^7NH$;

each $R^6$ is $C_1$-$C_{20}$ alkyl;

each $R^7$ is $C_1$-$C_{20}$ alkyl;

$R^6$ and $R^7$ are taken together with the nitrogen atom to form a cyclic amine or substituted cyclic amine with an O or S atom replacing a C atom on said cyclic amine;

each $R^{10}$ is independently $C_4$-$C_{20}$ alkyl, $C_4$-$C_{20}$ alkyl substituted by $C_1$-$C_{10}$ alkyl or $C_6$-$C_{15}$ aryl; $C_9$-$C_{40}$ aryl or $C_9$-$C_{40}$ aryl substituted by $C_1$-$C_{10}$ alkyl or $C_6$-$C_{20}$ aryl; and each $R^{11}$ is independently $C_1$-$C_{10}$ alkyl, $C_4$-$C_{20}$ alkyl substituted by $C_1$-$C_{10}$ alkyl or $C_6$-$C_{15}$ aryl.

2. The ink of claim 1, wherein $R^1$ is $C_3$-$C_{20}$ substituted cycloalkylene.

3. The ink of claim 2, wherein $R^2$ is $C_3$-$C_{20}$ substituted alkylene.

4. The ink of claim 3, wherein $R^3$ is —($R^{11}$—O—$R^{10}$—O—$R^{11}$)—.

5. The ink of claim 4, wherein $R^4$ is $C_1$-$C_7$ alkylene.

6. The ink of claim 1, wherein $R^6$ and $R^7$ are taken together with the nitrogen atom to form a substituted cyclic amine with an O or S atom replacing a C atom on said cyclic amine.

7. The ink of claim 1, wherein $R^1$ is $C_9$-$C_{40}$ substituted arylene.

8. The ink of claim 7, wherein $R^2$ is $C_3$-$C_{20}$ substituted alkylene.

9. The ink of claim 8, wherein $R^3$ is —($R^{11}$—O—$R^{10}$—O—$R^{11}$)—.

10. The ink of claim 9, wherein $R^4$ is $C_1$-$C_7$ alkylene.

11. The ink of claim 10, wherein $R^6$ and $R^7$ are taken together with the nitrogen atom to form a cyclic amine.

12. The ink of claim 10, wherein $R^6$ and $R^7$ are taken together with the nitrogen atom to form a substituted cyclic amine with an O or S atom replacing a C atom on said cyclic amine.

13. The ink of claim 1, wherein $R^1$ is $C_3$-$C_{20}$ substituted alkylene.

14. The ink of claim 13, wherein $R^2$ is $C_3$-$C_{20}$ substituted alkylene.

15. The ink of claim 14, wherein $R^3$ is $C_9$-$C_{20}$ alkylene or $C_2$ alkylene substituted by $C_1$-$C_{10}$ alkyl.

16. The ink of claim 15, wherein $R^6$ and $R^7$ are taken together with the nitrogen atom to form a substituted cyclic amine with an O or S atom replacing a C atom on said cyclic amine.

17. The ink of claim 3, wherein $R^3$ is $C_9$-$C_{20}$ alkylene or $C_2$ alkylene substituted by $C_1$-$C_{10}$ alkyl.

18. The ink of claim 17, wherein $R^6$ and $R^7$ are taken together with the nitrogen atom to form a substituted cyclic amine with an O or S atom replacing a C atom on said cyclic amine.

* * * * *